(12) United States Patent
Fontaine

(10) Patent No.: US 8,608,004 B2
(45) Date of Patent: Dec. 17, 2013

(54) SPRAYER TANK CAP WITH INCORPORATED PRESSURE RELIEF VALVE

(75) Inventor: James R. Fontaine, Marilla, NY (US)

(73) Assignee: Chapin Manufacturing, Inc., Batavia, NY (US)

( * ) Notice: Subject to any disclaimer, the term of this patent is extended or adjusted under 35 U.S.C. 154(b) by 1665 days.

(21) Appl. No.: 11/789,544

(22) Filed: Apr. 25, 2007

(65) Prior Publication Data

US 2008/0011364 A1  Jan. 17, 2008

Related U.S. Application Data

(60) Provisional application No. 60/795,054, filed on Apr. 26, 2006.

(51) Int. Cl.
*B65D 51/16* (2006.01)

(52) U.S. Cl.
USPC ............ 220/203.07; 220/203.04; 220/203.05; 220/203.06; 220/203.23; 220/203.27; 137/522; 137/537; 137/535; 137/538

(58) Field of Classification Search
USPC ............. 220/203.07, 203.04, 203.29, 203.27, 220/203.23, 203.05, 203.06; 137/535, 537, 137/528, 522; 251/83; 222/513, 514
See application file for complete search history.

(56) References Cited

U.S. PATENT DOCUMENTS

| | | | | |
|---|---|---|---|---|
| 4,782,961 A | * | 11/1988 | Lange | 212/308 |
| 4,809,869 A | * | 3/1989 | Cosgrove et al. | 220/288 |
| 5,299,718 A | * | 4/1994 | Shwery | 222/518 |
| D391,626 S | | 3/1998 | Spriegel | |
| 6,092,698 A | * | 7/2000 | Bayer | 222/402.25 |
| RE36,959 E | * | 11/2000 | Griffin | 220/210 |
| 6,695,228 B2 | | 2/2004 | Odessa | |
| 7,025,878 B2 | | 4/2006 | Spriegel | |
| 7,614,417 B2 | * | 11/2009 | Simon et al. | 137/202 |

FOREIGN PATENT DOCUMENTS

| | | |
|---|---|---|
| EP | 1233463 | 8/2002 |
| FR | 777287 | 2/1935 |
| GB | 2344 | 0/1911 |

* cited by examiner

*Primary Examiner* — Andrew Perreault
*Assistant Examiner* — James M Van Buskirk
(74) *Attorney, Agent, or Firm* — Kenneth J. Lukacher Law Group

(57) ABSTRACT

A cap for closing a sprayer tank has integrated therein a pressure relief valve having a tubular member providing a seat with respect to which a valve provided by an o-ring on a stem is displaced in a direction against the seat to close the valve. The stem is connected at one end thereof to a cap and is biased by a spring around the stem at the opposite end thereof into closing position. The cap is guided by a rim around the seat member. The cap defines around the stem a chamber. This chamber communicates with a spout which directs pressurized flow away from the cap when it is rotated to manually open the valve against the bias of the spring so as to relieve pressure in the tank. The passageway provided by the spout and the chamber is much larger than the passageway around the rim of the cap so that substantially all of the pressurized flow is diverted by this snout away from the fingers of the person grasping the cap at ears providing wings on the cap for rotating the cap to displace the valve to open position.

10 Claims, 5 Drawing Sheets

SPRAYER TANK CAP WITH INCORPORATED PRESSURE RELIEF VALVE

Priority is claimed to U.S. Provisional Application Ser. No. 60/795,054, filed Apr. 26, 2006.

DESCRIPTION

The present invention relates to pressure relief valves and provides facilities for manually opening the valve to relieve and reduce pressure in a tank without exposing the person actuating the valve to relieve the pressure to vapor or other pressurized flow out of the tank. Tanks with which the pressure relief valve may be used may be sprayer tanks which contain materials, such as insecticides and herbicides, that may be toxic and exposure to which is undesirable. The invention also provides a cap for a tank, such as a sprayer tank, in which the pressure relief valve may be integrated.

Reference may be had to U.S. Design Pat. No. 391,626, issued Mar. 3, 1998 to Clark F. Spriegel; U.S. Pat. No. 7,025,878, issued Apr. 11, 2006, also to Clark F. Spriegel; and U.S. Pat. No. 6,695,228, issued to Ronald M. Odessa, on Feb. 24, 2004, for further information with respect to sprayer tanks with which the cap provided by the invention may be used, which patents may be deemed by this reference to be incorporated herein and made part hereof.

Sprayer tanks are maintained under pressure so as to enable the pressurized flow of the material in the tank through a hose or wand and out of a nozzle. When the tank is under pressure, as when the tank is partially full, it may be desirable to open the tank by loosening and removing the cap thereon, so as to extract or add material to be sprayed to the tank. In such cases, the pressure in the tank makes it difficult to open the cap. Moreover, opening the cap on the tank may release the material in the tank in a vapor or spray which is undesirable, particularly since the material may be toxic. Under such circumstances, it is desirable to use the pressure relief valve with which the tank is equipped, as by being installed in a pipe stem extending from the tank near the top thereof. The valve is opened much like it would be opened in an over pressure condition, but rather than by the over pressure in the tank, by manually pulling up on the stem of the pressure relief valve. This stem may be connected to a cover or cap. Then, when the cap is actuated by being pulled up so as to open the pressure relief valve, pressurized flow of possibly toxic material may emanate from around the rim of the cap, which is connected to the stem while the cap is grasped by the fingers of the operator to pull and hold the stem upwardly to open the valve.

It is a feature of the present invention to facilitate avoiding exposure to vapor or other pressurized flow of material in the tank when the pressure relief valve is manually actuated to open position, thereby reducing contamination by virtue of such exposure, as by toxic material released via the pressure relief valve.

Briefly described, the invention enables flow of the pressurized material, such as pressurized vapor from the tank by diverting the flow away from the cap of the pressure relief valve. Such diversion is accomplished by providing a spout on the valve having an opening which communicates with the valve via a passageway therein, such spout being long enough to divert the pressurized flow of vapor or fluid away from the cap. The diversion of substantially all of the pressurized fluid or vapor is obtained by sizing the opening in the spout so that it is sufficiently greater than any other openings which are communicating with the passageway from the valve. The spout presents a much lower resistance to the flow enabling substantially all of the pressurized flow to be diverted out of the snout. The cap may be mounted to rotate on a rim around the seat. The opening provided by the spout is much larger than the opening presented between the rim and the seat. Accordingly, even when the valve is open, substantially all of the pressurized flow is diverted out of the snout and away from the fingers of the operator who opens the pressure relief valve as by rotating the cap. The valve seat may be a tubular member which is integrated with the closing cap, such as by being molded in or as a part of the tank closing cap, thereby providing a manually actuatable as well as automatically, spring operated pressure release valve mechanism.

The foregoing and other objects, features and advantages of the invention, as well as a presently preferred embodiment thereof, will become more apparent from a reading of the following description in connection with the accompanying drawings in which.

Figure 1:
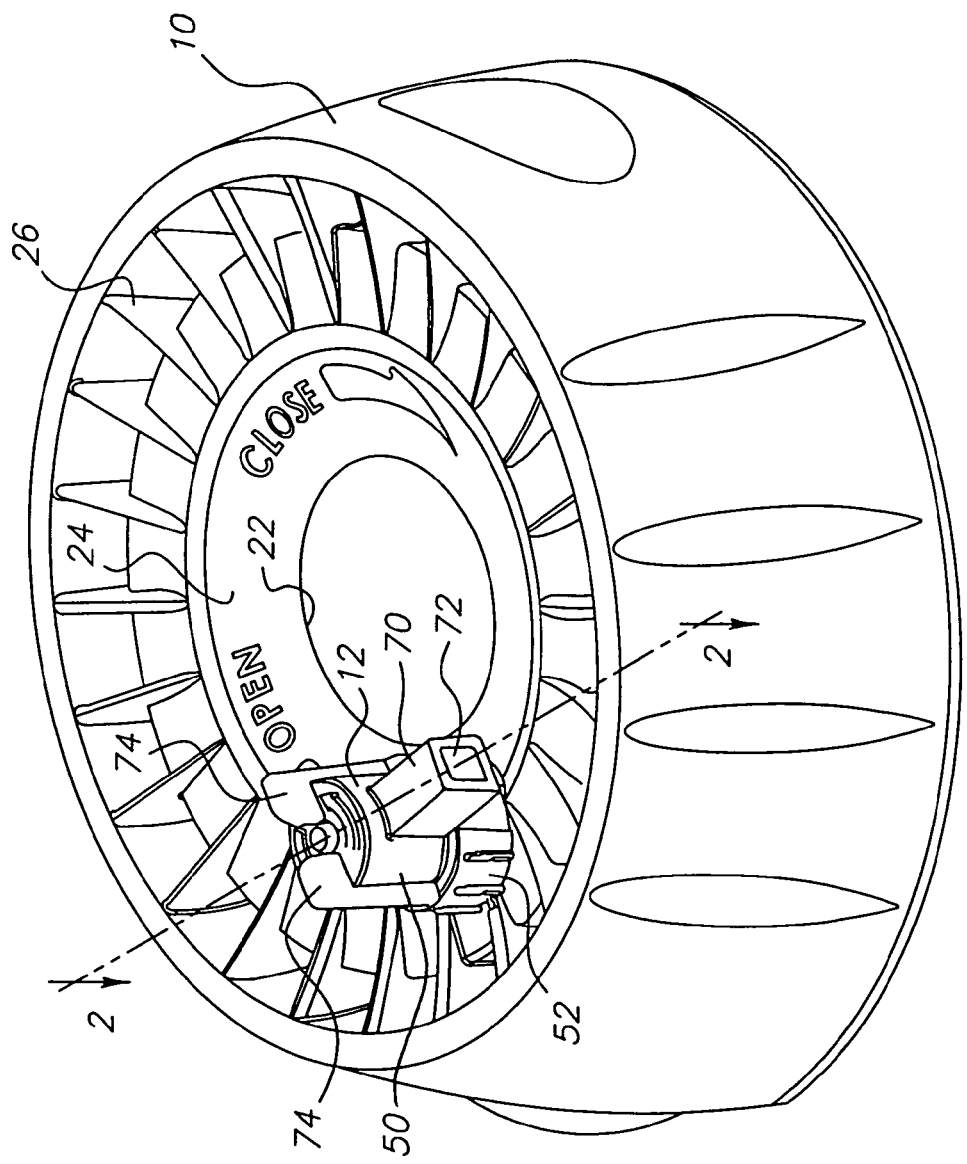
FIG. 1 is a perspective view from the top of a tank closing cap with incorporated pressure relief valve in accordance with the invention.
Figure 2:
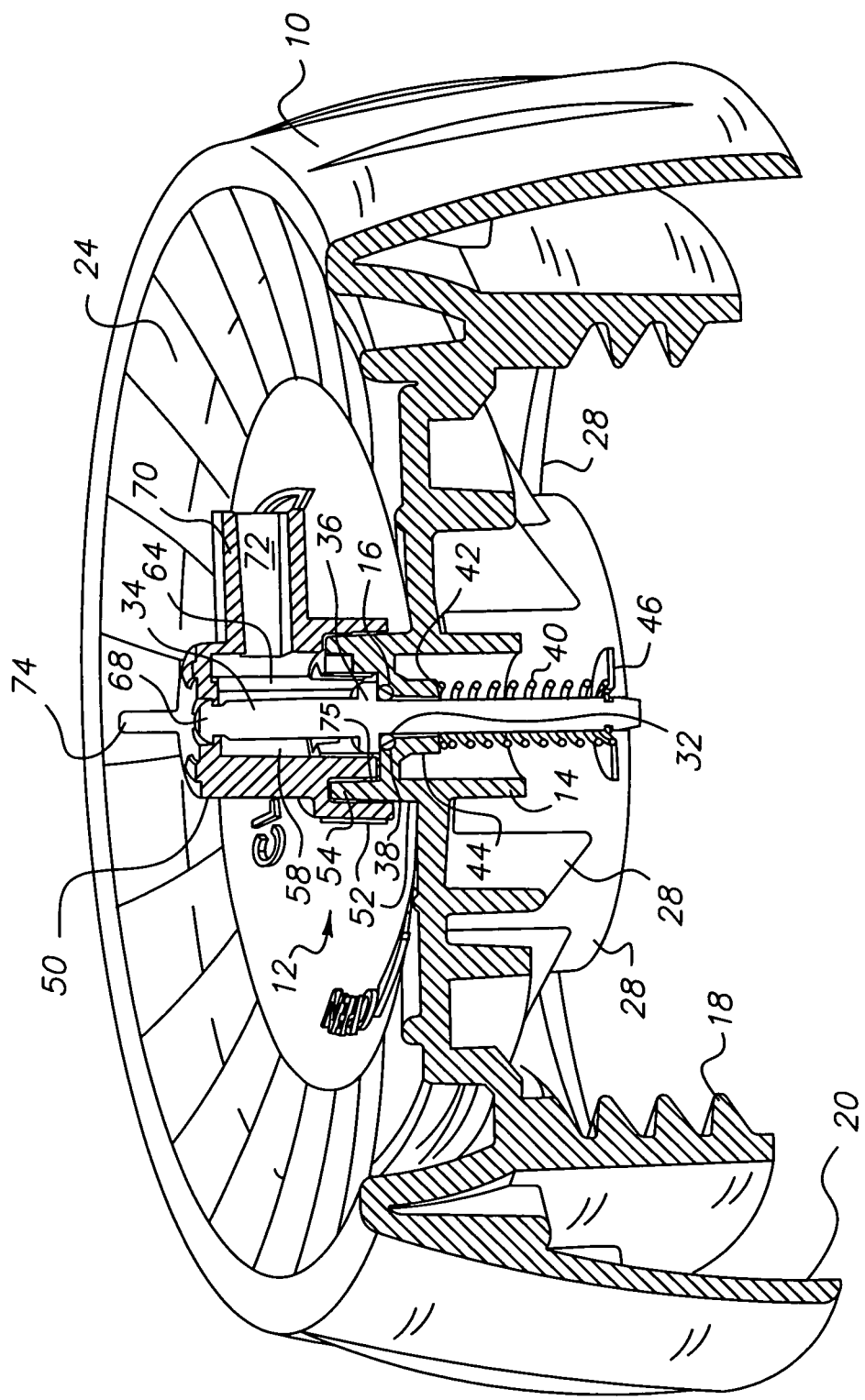
FIG. 2 is a broken-away, sectional view of the closing cap shown in FIG. 3 with the pressure relief valve in closed position, the view being taken along the line 2-2 in FIG. 1 in the direction of the arrows.
Figure 3:
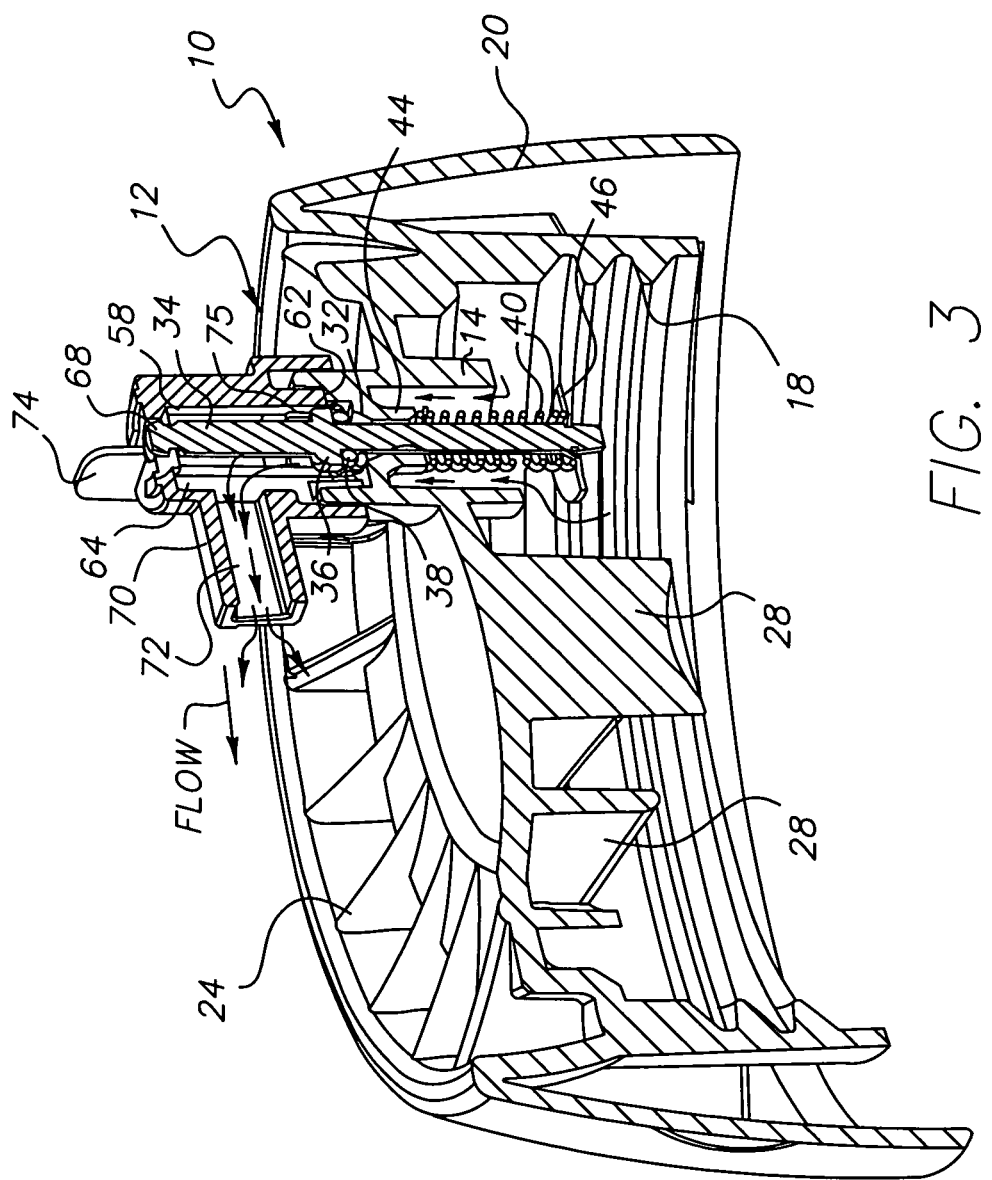
Figure 4:
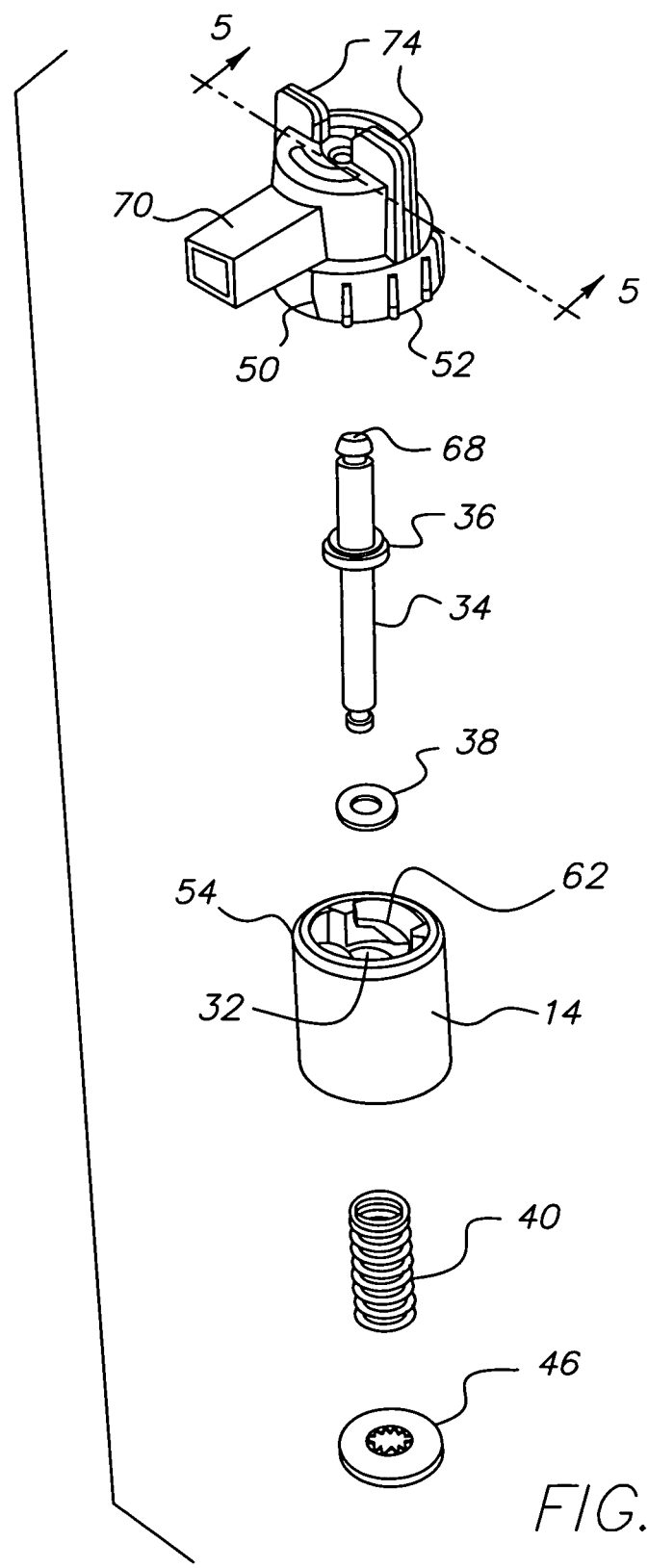
Figure 5:
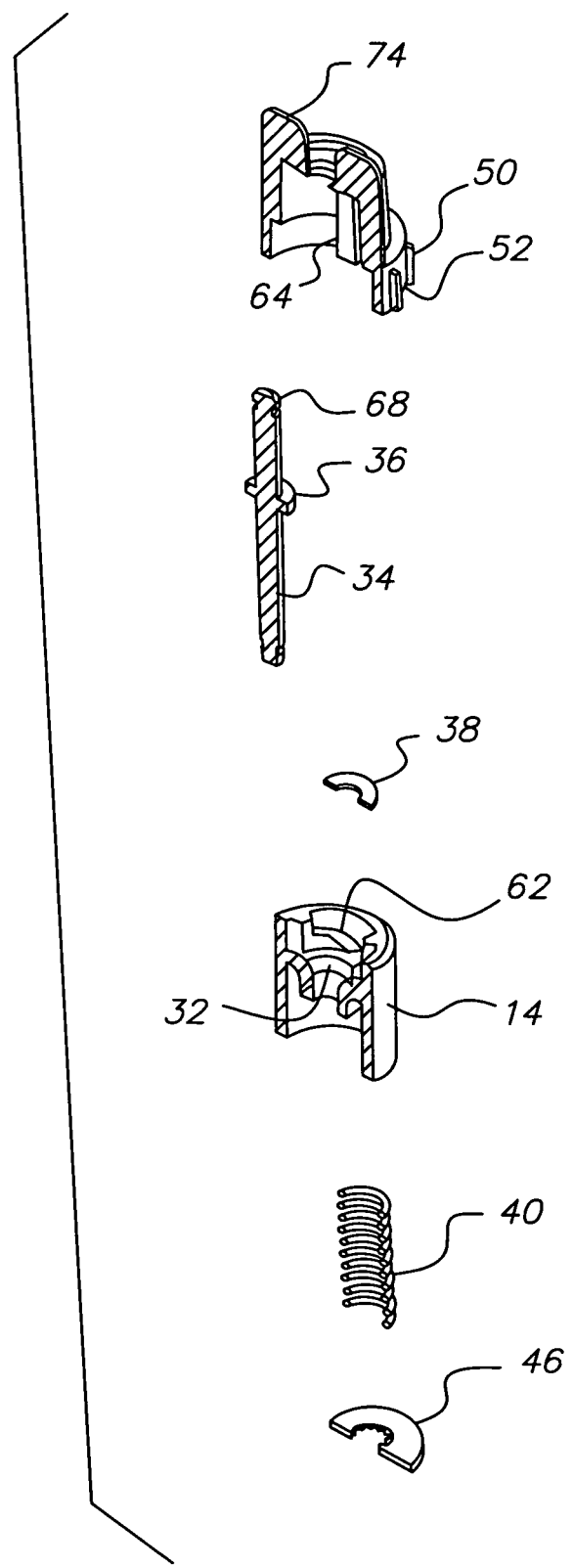

FIG. 3 is a view similar to FIG. 2 but with the pressure relief valve manually actuated by being rotated approximately 180° from the position thereof when the valve is closed, as shown in FIG. 2, and showing how the pressurized flow of liquid or vapor is diverted away from the cap of the pressure relief valve while it is rotated and also while it is held, upon actuation, to relieve the pressure in the tank;

FIG. 4 is an exploded view of the pressure relief valve shown in the previous figures, the valve seat being shown as a tubular member instead of being integrated in the tank closing cap as shown in FIGS. 1-3. It will be appreciated that the valve seat may be threaded for insertion in a pipe stem extending from a tank, rather than being integrated into the tank closing cap; and FIG. 5 is a section through the exploded view of FIG. 4 which is taken generally along the line 5-5 in FIG. 4.

Referring more particularly to the drawings, there is shown a sprayer tank closing cap 10. A pressure relief valve 12 is integrated with the cap as by having a tubular member 14 which defines the valve seat 16 of the valve 12 molded integrally with the cap 10.

The cap 10 has a screw on connection 18 to the sprayer tank as well as a decorative skirt 20. The cap 10 has an opening 22 in which the sprayer tank handle and its mechanism for pumping and pressurizing the tank may be disposed. Further information as to the sprayer tank, the handle and its mechanism may be found by reference to the above entitled patents. The tank may be of the type which is used in sprayers called "Spray-n-Go" which are manufactured and sold by Chapin Manufacturing, Inc. of Batavia, N.Y.

The cap region 24 around the opening 22 may be provided with radial and laterally disposed struts 26 and 28 on the top and bottom thereof, respectively. The struts 26 decoratively provide strengthening for the tank closing cap 10.

As shown in FIGS. 2 and 3 and also in FIGS. 4 and 5, the pressure relief valve 12 is tubular member 14, which provides the valve seat 16, has champhered or tapered inner periphery 32 on an inner periphery thereof. The valve is provided by a valve stem 34 having a flange 36 which captures an o-ring 38 and compresses the ring against the tapered inner periphery 32 to close the valve.

The stem 34 is surrounded at the lower end thereof by a compression spring 40, one end of which bears against a disc like surface 42 at the bottom of a collar 44 of the tubular member 14 providing the valve seat 16. A snap on washer 46 on the lower end of the stem 34 provides a bearing surface for the lower end of the spring 40. The spring 40 therefore biases the stem 34 and the ring 38 downwardly against the champhered periphery seat, closing the valve 16 unless and until an overpressure condition in the tank (principally applied to the lower end face of the stem 34) exceeds the biasing force and enables the pressure relief valve to open and relieve the pressure. In addition, the pressure relief valve has facilities for being manually actuated and displaced to an open position.

Manual displacement is provided by a valve cap 50 having a rim 52, which rides on a collar 54, at the upper end of the tubular member 14 providing the valve seat 16.

This cap 50 also is disposed as a sleeve around the valve stem 34 and defines a chamber 58 around the upper end of the stem 34. The stem 34 has a recessed, tapered button 68 at the upper end thereof which snaps into the top of the cap 50, connecting the cap 50 to stem 34. The tubular member 14 providing the valve seat 16 has along the upper end thereof, ramps 62 which are engaged by ramp following fingers 64, which are part of the cap 50 and extend downwardly from the top thereof to engage the ramps.

These ramps and fingers cause the cap 50 to rotate, either when displaced downwardly by the biasing force of the spring 40 to valve closing position as shown in FIG. 2 or upwardly to valve opening position as shown in FIG. 3. The cap 50 is provided with two features, one of which is the flow diverting snout 70 having an opening 72 communicating with the chamber 58. Also, the cap is provided with ears 74, which act as wings to enable the cap to be rotated manually for actuating the valve to open position.

When the valve cap is rotated, the fingers 64 and ramps 62 displace the cap upwardly in a direction along the axis of the stem 34. As shown in FIG. 3, pressurized flow of vapor or liquid from the tank is, in the direction of the arrows, through a passage in the tubular member providing the seat 16 around the stem 34, past the valve seat 16, and into the chamber 58. Flow is then through the diverting spout 70 and away from the hand and fingers of the user who rotates the cap and holds it to enable the venting of the tank through the pressure relief valve 12. The passageway around the stem 34, which may have a serpentine annular area 75 around the collar 52 and rim 54. The passageway in the vicinity of the cap 50 at the area 75 is of much smaller size than the passageway through the chamber 58 and the opening 72 in the spout 70. Exiting of vapor or liquid via the serpentine annular area 75 is reduced and substantially eliminated by virtue of the configuration and sizing of the spout opening 72 and chamber 58 relative to the area 75 into the vicinity of the cap is of much smaller size than the passageway through the chamber 58 and the opening 72 in the spout 70. Therefore, substantially all of the pressurized flow is out of the spout 70 and is diverted away from the person actuating the pressure relief valve, thereby avoiding exposure with the pressurized flow and the possible toxic materials therein.

Accordingly, there has been provided an improved pressure relief valve, and especially a spray tank cap or cover with which the pressure relief valve is integrated. Variations and modifications in the herein described apparatus, within the scope of the invention, will undoubtedly suggest themselves to those skilled in the art. Accordingly, the foregoing description should be taken as illustrative, and not in a limiting sense.

What is claimed is:

1. A pressure relief valve (PRV) for relieving pressure in a tank, both upon over pressure conditions in the tank and when manually actuated, said PRV comprising a valve stem displaceable with respect to a seat for containing pressure in said tank when the valve stem is closed against said seat and for relieving pressure in said tank via a path through said valve stem providing a passageway for pressurized flow when said valve stem is displaced from a closed to an open position, said PRV also comprising a valve cap mounted on said seat and attached to said valve stem, said valve cap having a spout and a chamber communicating with said passageway the passageway for pressurized flow comprises a serpentine annular area in the vicinity of the valve cap and an opening in the spout, wherein the serpentine annular area is of much smaller size than the chamber and the opening in the spout, thereby substantially all of the pressurized flow is diverted out of the opening in the spout avoiding exposure to the pressurized flow and the possible toxic materials therein.

2. The valve according to claim 1 further comprising a tank closing cap which closes the tank, and wherein said valve seat is integrated into a said tank closing cap.

3. The valve according to claim 1 further comprising a tank closing cover which closes the tank, and wherein said valve seat is provided by a tubular member integral with said tank closing cover and extending in opposite directions to provide an end outside of said tank and an end extending into said tank when said tank closing cover closes said tank.

4. The valve according to claim 1 wherein said valve seat is in a tubular member, said valve having a stem connected to said valve cap, said stem and said valve cap being biased in a direction to close said valve stem, said chamber being defined by said valve cap around said stem, said chamber communicating with said spout.

5. The valve according to claim 4 wherein said valve cap is rotatable to displace said valve stem in opposite directions from closed to opened positions.

6. The valve according to claim 5 further comprising a spring on said valve stem biasing said valve stem in the closing direction, and ramp surfaces in said seat on which said valve cap rides for rotation in a closing direction under the bias of said spring and in the opening direction when said valve cap is manually rotated.

7. The valve according to claim 6 further comprising ears providing wings on said valve cap by which said valve cap can be manually grasped and rotated in the opening direction.

8. The valve according to claim 1 wherein said opening and chamber of said spout is of a size that presents a lower resistance to said pressurized flow than any other opening along said passageway to enable passage of substantially all of said pressurized flow out of said spout when said pressurized flow is present in said passageway.

9. An apparatus for relieving pressure in a tank, both upon over pressure conditions in the tank and when manually actuated comprising:

means for relieving contained pressure in said tank via a path providing a passageway for pressurized flow from said tank;

said pressure relieving (PR) apparatus (PRA) having a cap; and means in said PRA cap in communication with said passageway for passage of said pressurized flow from said tank away from said PRA cap when said pressurized flow is present in said passageway, wherein said means in said PRA cap provides a serpentine annular area that presents a lower resistance to said pressurized flow than any other opening along said passageway to enable passage of substantially all of said pressurized flow through said means in said PRA cap away from said PRA cap.

10. The apparatus according to claim 9 wherein said means for relieving is positionable between a first position to contain said pressure and a second position to relieve said pressure along said path.

* * * * *